Figure 1:
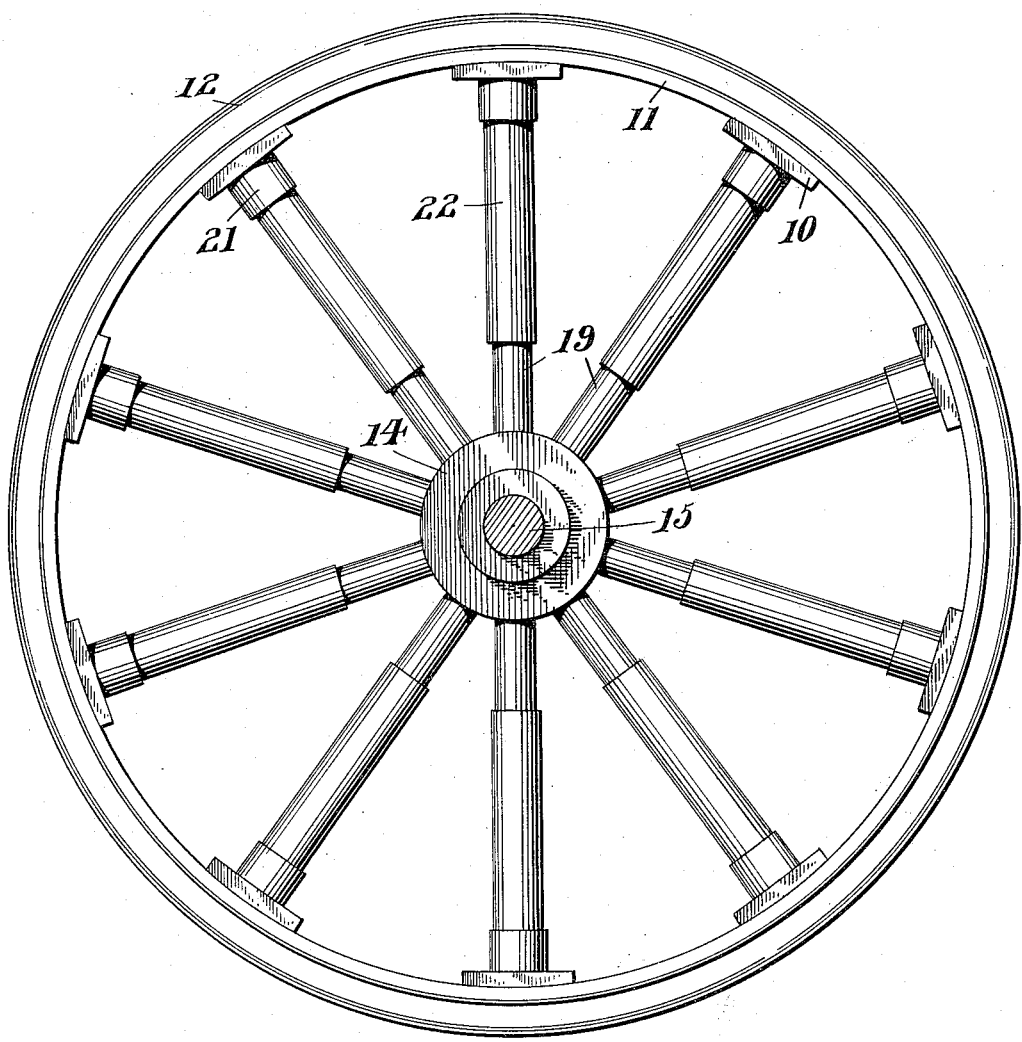

P. CYKAJLA.
RESILIENT WHEEL.
APPLICATION FILED APR. 24, 1915.

1,164,994.

Patented Dec. 21, 1915.
2 SHEETS—SHEET 1.

P. CYKAJLA.
RESILIENT WHEEL.
APPLICATION FILED APR. 24, 1915.
1,164,994.
Patented Dec. 21, 1915.
2 SHEETS—SHEET 2.
Fig. 2.
Fig. 3.
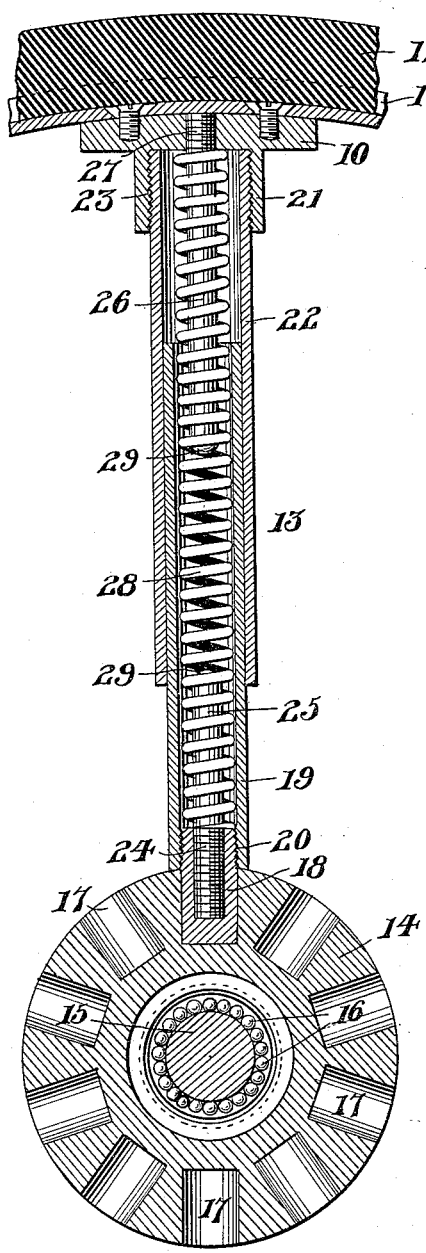
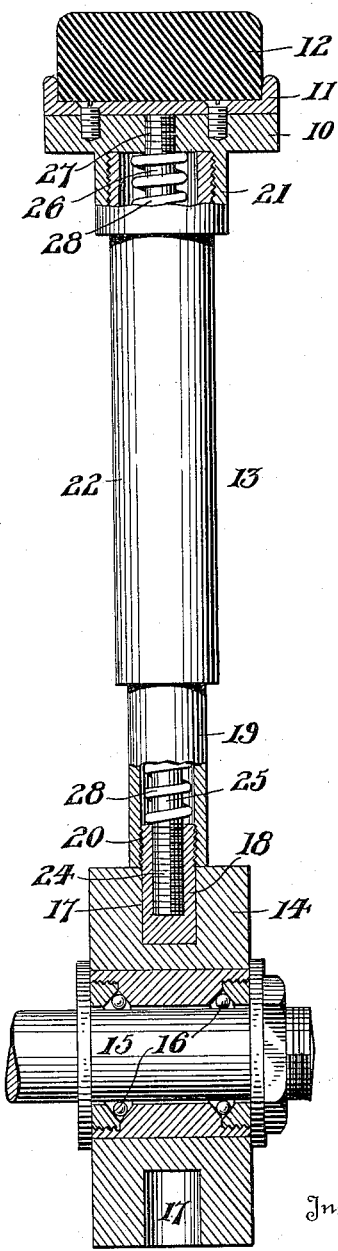
Inventor
P. Cykajla
By
A. M. Wilson
Attorney

UNITED STATES PATENT OFFICE.

PETER CYKAJLA, OF PERTH AMBOY, NEW JERSEY, ASSIGNOR OF THREE-FOURTHS TO CHARLES KOVACS, OF PERTH AMBOY, NEW JERSEY.

RESILIENT WHEEL.

1,164,994.  Specification of Letters Patent.  Patented Dec. 21, 1915.

Application filed April 24, 1915. Serial No. 23,635.

*To all whom it may concern:*

Be it known that I, PETER CYKAJLA, a subject of the King of Hungary, residing at Perth Amboy, in the county of Middlesex and State of New Jersey, have invented certain new and useful Improvements in Resilient Wheels, of which the following is a specification.

This invention relates to new and useful improvements in resilient wheels.

The primary object of this invention is to provide a wheel structure that is light in weight and is easy and cheap to manufacture but which affords sufficient resiliency for vehicles such as automobiles and thereby rendering the use of pneumatic tires unnecessary.

A further object of the device is the provision of a wheel having the radially arranged spokes thereof capable of resiliently supporting the vehicle axle upon which the wheel is journaled.

A still further object is the provision of an extremely simple form of resilient mounting spoke for a wheel, the part of which may be readily separated whenever desired and the individual spoke thus disassembled for such purposes as repairs or the changing of the degree of resiliency thereof.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like designating characters refer to corresponding parts throughout the several views:—Figure 1 is a side elevation of a wheel of the present form, the axle being shown in transverse section. Fig. 2 is a central longitudinal sectional view through one of the spoke members upon a plane transversely of the hub, and Fig. 3 is a radial transverse section through a portion of the wheel and one of the spokes, the latter being shown partially in side elevation.

Referring more in detail to the drawings, it will be seen that the wheel consists of the rim blocks 10 having a metallic rim 11 for seating a cushion tire 12, while the resilient spokes 13 are radially arranged between the said rim blocks and the hub 14. The said hub is mounted in the usual manner upon the vehicle axle 15 by means of the intervening anti-friction bearings 16. The hub 14 has radially arranged outwardly opening cylindrical sockets 17 adapted for the reception of spoke mounting cylindrical plugs 18 adapted to be securely wedged therein. The said plugs have their outer ends projecting outwardly of the said sockets and provided with a tubular spoke section 19 externally screw-threaded thereon as at 20. The said rim blocks 10 are provided with inwardly radially projecting bosses 21 in axial alinement with the said plugs 18. Outer tubular spoke members 22 are internally screw-threaded as at 23 within the said bosses 21 and telescope around the said inner spoke portions 19.

Each of the plugs 18 is provided with a threaded central bore 24 within which a spring positioning pin 25 is threaded in seating engagement, while a similar outer spring positioning pin 26 is threaded within the central bore 27 of each of the rim blocks 10. The confronting ends of the said pins are similarly rounded as at 29. A helical expansion spring 28 is arranged within the telescoping spoke sections 19 and 22 and has its opposite end portions encircling the said outer and inner pins 26 and 25 respectively, with its ends seated on the outer end or face of the plug 18 and inner end or face of the rim block 10 respectively.

From this detailed description of the invention, the complete operation thereof will be apparent in that any weight of the vehicle upon the axle 15 compresses the spring 28 in the lowermost spokes and thus resiliently mounts the axle thereupon so that the axle will be cushioned during the travel of the vehicle provided with the present form of wheel. It is to be especially noted that any one of the spokes 13 may be completely disassembled whenever desired by merely unscrewing the spoke sections 19 and 22 from their respective threaded engagements with the plug 18 and boss 21, while the pins 25 and 26 may then be removed for purposes of repairing the spring 28 or to supply an entirely new spring having a different degree of resiliency. A serviceable and extremely simple spring spoke member is the result which can be readily arranged to accommodate different loads as well as other traffic conditions.

While the form of the invention herein shown and described is what is believed to be the preferred embodiment thereof, it is nevertheless to be understood that minor changes may be made in the form, proportion and details of construction without departing from the spirit and scope of the invention as set forth in the appended claim.

What I claim as new is:—

A hub provided with radial sockets, plugs seated in the sockets, rim blocks mounted within the rim and having internally threaded bosses extending radially and inwardly from the rim and also having centrally arranged threaded bores, a tubular inner spoke section threaded externally upon each of the said plugs, an outer tubular spoke section threaded within each of the said bosses and being of greater diameter than the corresponding inner spoke section and exteriorly telescoping therewith, spring positioning pins arranged within the said spoke sections and having their opposite ends threaded within the said rim blocks and plugs in the hub respectively and having rounded confronting ends, and a helical expansion spring within each pair of the said spoke sections surrounding the said pins and seated upon the confronting faces of the said rim blocks and plugs.

In testimony whereof I affix my signature in presence of two witnesses.

PETER CYKAJLA.

Witnesses:
 Louis Csipo,
 Margarett P. Zayle.

Copies of this patent may be obtained for five cents each, by addressing the "Commissioner of Patents, Washington, D. C."